United States Patent [19]

Bugenov et al.

[11] Patent Number: 4,777,029
[45] Date of Patent: Oct. 11, 1988

[54] METHOD OF EXTRACTING PHOSPHORUS FROM SLIME

[75] Inventors: Erken S. Bugenov, Chimkent; Mukan D. Atabaev, Dzhambul; Evsei A. Selitsky, Dzhambul; Klim A. Kim, Dzhambul; Valery V. Klestov, Dzhambul; Alfia K. Gaifullina; Isak K. Sataev, both of Chimkent; Vladimir F. Shulga, Dzhambul; Erkebulan S. Murzagaliev, Dzhambul; Jury V. Shkarupa, Dzhambul; Manat R. Barlybaev, Dzhambul, all of U.S.S.R.

[73] Assignee: Kazakhsky Khimiko-Tekhnologichesky Institut, Chimkent, U.S.S.R.

[21] Appl. No.: 130,022

[22] Filed: Dec. 8, 1987

[51] Int. Cl.$^4$ ................................................ C01D 3/02
[52] U.S. Cl. ..................................................... 423/322
[58] Field of Search ......................................... 423/322

[56] References Cited

U.S. PATENT DOCUMENTS

| | | | |
|---|---|---|---|
| 3,104,952 | 9/1963 | Hartig | 423/322 |
| 3,436,184 | 4/1969 | Hinkebein | 423/322 |
| 3,442,621 | 5/1969 | Hinkebein | 423/322 |
| 3,615,218 | 10/1971 | Post et al. | 423/322 |
| 4,192,853 | 3/1980 | Chernogorenko et al. | 423/322 |

FOREIGN PATENT DOCUMENTS

| | | | |
|---|---|---|---|
| 856976 | 8/1981 | U.S.S.R. | 423/322 |
| 865786 | 9/1981 | U.S.S.R. | 423/322 |
| 891558 | 12/1981 | U.S.S.R. | 423/322 |
| 919988 | 4/1982 | U.S.S.R. | 423/322 |
| 1033426 | 8/1983 | U.S.S.R. | 423/322 |

*Primary Examiner*—John Doll
*Assistant Examiner*—Wayne A. Langel
*Attorney, Agent, or Firm*—Burgess, Ryan and Wayne

[57] ABSTRACT

A method of extracting phosphorus from slime resides in treating the slime with a surfactant and/or a polyampholteric electrolyte upon heating.

5 Claims, No Drawings

METHOD OF EXTRACTING PHOSPHORUS FROM SLIME

FIELD OF THE INVENTION

The present invention relates to the production of phosphorus and more particularly to a method of extracting phosphorus from slime.

The invention will find application in processing slimes formed as a side product in the production of phosphorus, said slimes being of different compositions and storable for different periods of time.

BACKGROUND ART

A great variety of prior-art methods of extracting phosphorus from slimes is a result of a complex structure of the slimes. Slimes are aqueous emulsions of phosphorus, said emulsions being stabilized with various emulsifiers of organic or inorganic origin, such as asphalt-resinous compounds, soot, finely dispersed mineral dust.

An aggregation stability of phosphorus slimes is characterized by the dispersity of phosphorus particles, the latter being dependent on the nature of the stabilizer. To stabilize less stable phosphorus emulsions, use is made of low-molecular hydrocarbons (calcium soaps), so-called "oils". The most stable slimes are stabilized with asphalt-resinous compounds; the higher the concentration of these compounds in the slime, the more difficult it is to extract phosphorus from slime.

The type of the stabilizer used depends, first of all, on the composition of the raw material being processed, the extent of its preparation, and the technology of phosphorus production.

The diversity of structural elements entering into the composition of the protective layers of phosphorus particles dictates a great variety of the reagents used for destruction of the structural elements. Among them are chlorinated hydrocarbons, carbon disulphide, pyrolysis resin, hexavalent chromium compounds in an acid medium, hydrogen peroxide in phosphoric acid.

An application of non-regenerable critical inorganic reagents in the process of phosphorus extraction from slime makes the process more expensive and contaminates the environment with toxic compounds.

Known in the art is a method of phosphorus extraction from slime by treating the slime with an organochlorine reagent in the presence of hydrogen peroxide upon heating. The mass ratio of the organic reagent and phosphorus in the slime is 8–10:1 (SU, A, 856976). The extraction of phosphorus from slime by this method is based on the extraction of organic stabilizers of the phosphorus emulsion with chlorinated hydrocarbons in the presence of an oxidizer. The use of large volumes of the extractants is the main condition for the extraction of the above stabilizers; this complicates the technological process and makes it more expensive.

Because of a partial hydrolysis of the hydrocarbons, which results in the formation of hydrochloric acid and enchances the corrosion activity of the reaction medium, corrosion-resisting equipment must be used.

This method makes it possible to extract phosphorus in high yield only when poorly stabilized phosphorus slimes are processed. This is determined by the nature of the extracting agent.

The slimes stabilized with asphalt-resinous compounds cannot be processed by this method.

BRIEF DESCRIPTION OF THE INVENTION

It is an object of the invention to provide a method of extracting phosphorus from slime, which will ensure complete extraction of phosphorus when processing slimes of any stabilization extent.

Said object is accomplished by that a method of extracting phosphorus from slime by treating the slime with an organic reagent upon heating is proposed in which, according to the invention, a surfactant and/or polyamphoteric polyelectrolyte are/is used as the organic reagent.

The proposed method ensures a practically complete extraction of phosphorus from slimes featuring different stabilization extends and storage times. The reagents being used do not contaminate phosphorus and provide favourable conditions for purification of waste water from suspensions. These reagents are universal with respect to different types of slimes, easily available, cheap, and corrosion-inactive, which simplifies considerably the technology of the process.

For maximum extraction of phosphorus from slimes stabilized with asphalt-resinous compounds, it is expedient to treat said slimes with a surfactant such as oxyethylated alkylphenol in amount 0.5–10 g per ton of the slime.

To extract phosphorus from slimes stabilized with calcium soaps ("oils"), it is preferably to use as a surfactant partially neutralized fatty acids in an amount of 0.5–10% of the slime mass.

To extract phosphorus from slimes stabilized with molecular-colloid emulsifiers (resins), it is desirable to use a polyamphoteric polyelectrolyte such as the product of partial hydrolisis of polyacrylonitrile, said polyelectrolyte being taken in an amount of 10–100 g per ton of the slime.

To process the slimes with phosphorus content of 30–40 mass % and stabilized with organic and mineral components, it is expedient to use a mixture of hydroxyethylated alkylphenol and a product of partial hydrolysis of polyacrylonitrile at their mass ratio of 1:30–100.

DETAILED DESCRIPTION OF THE INVENTION

The proposed method is accomplished in the following way.

To extract phosphorus from slimes which are side products of phosphorus production, said slimes are treated with an organic reagent. Depending on the composition of the slime, determined by the character of the stabilizers, it is proposed to use as an organic reagent surfactants (nonionogenic and anion-active) and/or a polyamphoteric polyelectrolyte.

The action of the organic reagents chosen is based on their demulsifying activity. Having a high adsorption activity, they replace and peptize the stabilizers.

To extract phosphorus from slimes stabilized with calcium soaps (low-molecular hydrocarbons, "oils"), it is proposed to use anion-active surfactants such as synthetic fatty acids partially neutralized with an alkali. The action of such demulsifiers is based on a phase inversion residing in that insoluble calcium soaps are transformed into soluble sodium soaps and the film from the phosphorus particles is removed, thereby creating favourable conditions for the coalescence of the particles. Due to their availability, it is expedient to use bottom residues remaining after an oxidative treatment of paraffins as synthetic fatty acids, said residues being subjected to partial neutralization. The above demulsifier is introduced into slime in an amount of 0.5–10% of the slime mass. To extract phosphorus from slimes stabilized with "armoring" solid emulsifiers (asphaltenes, asphalt-resinous compounds) with a predominant content of asphaltenes, it is proposed to use nonionogenic surfactants whose action is based on hydrophilization of the hydrophobic surface of said emulsifiers with subsequent transformation of the emulsifiers into an aqueous phase and additional peptization. As a result, the surface of the phosphorus particles is purified and the particles coalesce into large particles. As nonionogenic compounds it is proposed to use hydroxyethylated alkylphenols in an amount of 0.5–10 g per ton of the slime being processed. To extract phosphorus from slimes stabilized with molecular-colloid emulsifiers (resins) adsorbed due to their surface activity on the surface of the phosphorus particles, it is proposed to use polyampholeric polyelectrolytes. The products of partial hydrolysis of polyacrylonitrile taken in an amount of 10–100 g per ton of the slime are recommended to be used as polyamphoteric polyelectrolytes. Polyelectrolytes destroy phosphorus emulsions because of an adsorption substitution of the emulsifier. The polyelectrolyte molecule is adsorbed on the phosphorus particles much stronger than the initial stabilizer of the slime, not favouring, however, the formation of stable films whose destruction results in a coalescence of the particles. In addition, the coalescence of the phosphorus particles in the slime is promoted by flocculation of the suspension particles with longchain polyelectrolyte molecules.

To extract phosphorus from slime containing a great amount of mineral impurities (up to 20 mass %) and a relatively low amount of phosphorus (up to 40 mass %), it is recommended to use a mixture of hydroxyethylated alkylphenol and the product of partial hydrolysis of polyacrylonitrile in a mass ratio of 1:30–100.

An effective destruction of such slimes by said mixture is due to a clearly pronounced synergism residing in that the polyelectrolyte molecule cross-links mineral particles, enabling the molecules of hydroxyethylated alkylphenol to destroy the organic stabilizers and "armoring" emulsifiers, transforming them into an aqueous phase. This favours the coalescence of phosphorus particles. The synergism is most pronounced when the reagents are used at the mass ratio specified above.

The proposed reagents ensure maximum extraction of phosphorus from slimes with different stabilization extents and storage times. In addition to their main application as demulsifiers, the proposed reagents, getting into waste water, favour the purification of waste water from suspensions due to flocculation of the colloid particles and clean pipes and equipment from slime sediments due to their hydrophilization and peptization. The proposed method does not cause contamination of the environment with toxic compounds.

Specific examples of realizing the proposed method are given hereinbelow by way of illustration.

EXAMPLE 1

A slime containing (in mass %) phosphorus, 50; solids, 10; and water, 40, stabilized predominantly with low-molecular hydrocarbons ("oils"), is treated to extract phosphorus. The slime (100 g) is placed into a reactor, heated to 70° C., and treated upon stirring with 0.5 g of partially neutralized fatty acids ($C_{16}$–$C_{21}$). The process duration is 1 hour.

After the separation of the slime into a phosphorus layer and a mineral layer, the latter is washed with water from the reactor.

The yield of phosphorus is 90 mass %.

EXAMPLE 2

A slime containing (in mass %) phosphorus, 60; solids, 5; and water, 35, stabilized predominantly with low-molecular hydrocarbons ("oils"), is treated to extract phosphorus. The slime (100 g) is placed into a reactor, heated to 70° C., and treated upon stirring with 3 g of partially neutralized fatty acids ($C_{16}$–$C_{21}$). The process duration is 1 hour. After the separation of the slime into a phosphorus layer and a mineral layer, the latter is washed with water from the reactor. The yield of phosphorus is 99.5%.

EXAMPLE 3

A slime containing (in mass %) phosphorus, 40; solids, 15; and water, 45, stabilized predominantly with low-molecular hydrocarbons ("oils") and asphalt-resinous compounds, is treated to extract phosphorus. The slime (100 g) is placed into a reactor, heated to 70° C., and treated upon stirring with 5 g of partially neutralized fatty acids ($C_{16}$–$C_{21}$). The process duration is 2 hours. After the separation of the slime into a phosphorus layer and a mineral layer, the latter is washed with water from the reactor.

The yield of phosphorus is 96 mass %.

EXAMPLE 4

A slime containing (in mass %) phosphorus, 57; solids, 12; and water, 31, stabilized predominantly with asphalt-resinous compounds, is treated to extract phosphorus. The slime (100 g) is placed into a reactor, heated to 70° C., and treated upon stirring with 5 g of partially neutralized fatty acids ($C_{16}$–$C_{21}$). The process duration is 2 hours.

After the separation of the slime into a phosphorus layer and a mineral layer, the latter is washed with water from the reactor. The yield of phosphorus is 90 mass %.

EXAMPLE 5

A slime containing (in mass %) phosphorus, 65; solids, 5; and water, 30, stabilized predominantly with asphalt-resinous compounds, is treated to extract phosphorus. The slime (100 g) is placed into a reactor, heated to 70° C., and treated upon stirring with 0.05 mg of hydroxyethylated alkylphenol. The process duration is 2 hours. After the separation of the slime into a phosphorus layer and a mineral layer, the latter is washed with water from the reactor.

The yield of phosphorus is 98 mass %.

EXAMPLE 6

A slime containing (in mass %) phosphorus, 60; solids, 8; and water, 32, stabilized predominantly with asphalt-resinous compounds, is treated to extract phosphorus. The slime (100 g) is placed into a reactor, heated to 70° C., and treated upon stirring with 0.2 mg of hydroxyethylated alkylphenol. The process duration is 2 hours. After the separation of the slime into a phosphorus layer and a mineral layer, the latter is washed with water from the reactor.

The yield of phosphorus is 99.5%.

EXAMPLE 7

A slime containing (in mass %) phosphorus, 55; solids, 12; and water, 33, stabilized predominantly with asphalt-resinous compounds, is treated to extract phosphorus. The slime (100 g) is placed into a reactor, heated to 70° C., and treated upon stirring with 1 mg of hydroxyethylated alkylphenol. The process duration is 2 hours. After the separation of the slime into a phosphorus layer and a mineral layer, the latter is washed with water from the reactor.

The yield of phosphorus is 95 mass %.

EXAMPLE 8

A slime containing (in mass %) phosphorus, 67; solids, 7; and water, 26, stabilized predominantly with resins, is treated to extract phosphorus. The slime (100 g) is placed into a reactor, heated to 70° C., and treated upon stirring with 1 mg of the product of partial hydrolysis of polyacrylonitrile. The process duration is 1 hour. After the separation of the slime into a phosphorus layer and a mineral layer, the latter is washed with water from the reactor.

The yield of phosphorus is 95.5%.

EXAMPLE 9

A slime containing (in mass %) phosphorus, 67; solids, 7; and water, 26, stabilized predominantly with resins, is treated to extract phosphorus. The slime (100 g) is placed into a reactor, heated to 70° C., and treated upon stirring with 5 mg of the product of partial hydrolysis of polyacrylonitrile. The process duration is 1 hour. After the separation of the slime into a phosphorus layer and a mineral layer, the latter is washed with water from the reactor.

The yield of phosphorus is 98 mass %.

EXAMPLE 10

A slime containing (in mass %) phosphorus,67; solids, 7; and water, 26, stabilized predominantly with resins, is treated to extract phosphorus. The slime (100 g) is placed into a reactor, heated to 70° C., and treated upon stirring with 10 g of the procuct of partial hydrolysis of polyacrylonitrile. The process duration is 1 hour. After the separation of the slime into a phosphorus layer and a mineral layer, the latter is washed with water from the reactor.

The yield of phosphorus is 99.9 mass %.

EXAMPLE 11

A slime containing (in mass %) phosphorus, 50; solids, 12; and water, 38, stabilized predominantly with asphalt-resinous compounds with a prevailing content of resins, is treated to extract phosphorus. The slime (100 g) is placed into a reactor, heated to 70° C., and treated upon stirring with 10 mg of the product of partial hydrolysis of polyacrylonitrile. The process duration is 2 hours. After the separation of the slime into a phosphorus layer and a mineral layer, the latter is washed with water from the reactor.

The yield of phosphorus is 95 mass %.

EXAMPLE 12

A slime containing (in mass %) phosphorus, 40; solids, 15; and water, 45, stabilized predominantly with asphalt-resinous compounds with a prevailing content of asphaltenes, is treated to extract phosphorus. The slime (100 g) is placed into a reactor, heated to 70° C., and treated upon stirring with 6.2 mg of a mixture of hydroxyethylated alkylphenol and the product of partial hydrolysis of polyacrylonitrile in a mass ratio of 1:30. The process duration is 2 hours. After the separation of the slime into a phosphorus layer and a mineral layer, the latter is washed with water from the reactor.

The yield of phosphorus is 95.5 mass %.

EXAMPLE 13

A slime containing (in mass %) phosphorus,45; solids, 18; and water, 37, stabilized predominantly with asphalt-resinous compounds with a prevailing content of asphaltenes is treated to extract phosphorus. The slime (100 g) is placed into a reactor, heated to 70° C., and treated upon stirring with 10.1 mg.

of a mixture of hydroxyethylated alkylphenol and the product of partial hydrolysis of polyacrylonitrile in a mass ratio of 1:100. The process duration is 2 hours. After the separation of the slime into a phosphorus layer and a mineral layer, the latter is washed with water from the reactor.

The yield of phosphorus is 99 mass %.

EXAMPLE 14

A slime containing (in mass %) phosphorus, 38; solids, 20; water, 42, stabilized predominantly with asphalt-resinous compounds with a prevailing content of asphaltenes is treated to extract phosphorus. The slime (100 g) is placed into a reactor, heated to 70° C., and treated upon stirring with 5.1 mg of a mixture of hydroxyethylated alkylphenol and the product of partial hydrolysis of polyacrylonitrile in a mass ratio of 1:50. The process duration is 2 hours. After the separation of the slime into a phosphorus layer and a mineral layer, the latter is washed with water from the reactor.

The yield of phosphorus is 97.5 mass %.

What is claimed is:

1. A method of extracting phosphorus from slime, residing in that the slime is treated with an organic reagent upon heating, said organic reagent being selected from the group consisting of a surfactant, a polyamphoteric electrolyte, and a mixture thereof.

2. A method as claimed in claim 1, wherein as a surfactant use is made of hydroxyethylated alkylphenol in an amount of 0.5–10 g per ton of the slime.

3. A method as claimed in claim 1, wherein as a surfactant use is made of partially neutralized fatty acids in an amount of 0.5–10% of the slime mass.

4. A method as claimed in claim 1, wherein as a polyamphoteric electrolyte use is made of the product of partial hydrolysis polyacrylonitrile in an amount of 10–100 g per ton of the slime.

5. A method as claimed in claim 1, wherein as an organic reagent use is made of a mixture of hydroxyethylated alkylphenol and the product of partial hydrolysis of polyacrylontrile in a mass ratio of 1:3–100.

* * * * *